(12) United States Patent
Hsu

(10) Patent No.: US 8,917,895 B2
(45) Date of Patent: Dec. 23, 2014

(54) HANDHELD LOUDSPEAKER DEVICE

(75) Inventor: Wei Hsu, Taipei (TW)

(73) Assignee: Weis Design Co., Ltd., Taipei (TW)

( * ) Notice: Subject to any disclaimer, the term of this patent is extended or adjusted under 35 U.S.C. 154(b) by 440 days.

(21) Appl. No.: 13/492,262

(22) Filed: Jun. 8, 2012

(65) Prior Publication Data

US 2013/0236044 A1 Sep. 12, 2013

(30) Foreign Application Priority Data

Mar. 9, 2012 (TW) .............................. 101204379 U

(51) Int. Cl.
*H04R 9/06* (2006.01)
*H04M 1/00* (2006.01)

(52) U.S. Cl.
USPC .......................... 381/334; 381/336; 455/569.1

(58) Field of Classification Search
USPC ......... 381/334, 336–342, 345, 349, 351, 182;
381/160, 161, 374, 355, 360, 364, 343,
381/322; 379/454, 455, 446; 455/575.1,
455/556.1, 575.8, 569.1
See application file for complete search history.

(56) References Cited

U.S. PATENT DOCUMENTS

2002/0009195 A1* 1/2002 Schon ........................... 379/454

* cited by examiner

*Primary Examiner* — Vivian Chin
*Assistant Examiner* — Ammar Hamid
(74) *Attorney, Agent, or Firm* — Muncy, Geissler, Olds & Lowe, P.C.

(57) ABSTRACT

A handheld loudspeaker device, comprising: a handheld base, a first port and a second port, a first sound guidance tube, and a second sound guidance tube. A front end of said handheld base is provided with a receiving space to place said mobile phone. Said first port and said second port are each placed on one side of said receiving space, so that said first port is connected to a loudspeaker of said mobile phone to transmit sound, and said second port is connected to a microphone to receive voice. When a user activates loudspeaker function of said mobile phone, stereo sound can be obtained at the loudspeaker slots corresponding to a first horn port and a second horn port. Through said second port, a user can speak to a receiving party at a remote end via the Public Switched Telephone Network (PSTN) and the Internet.

10 Claims, 2 Drawing Sheets

HANDHELD LOUDSPEAKER DEVICE

BACKGROUND OF THE INVENTION

1. Field of the Invention

The present invention relates to a handheld loudspeaker device, and in particular to a handheld loudspeaker device, capable of making the output sound of the mobile phone single channel to be stereo sound without requiring a power supply.

2. The Prior Arts

In general, the ways to receive and hear the sound or voice transmitted through a mobile phone is through a built-in loudspeaker in the handset, a wire earphone, or a wireless earphone. Therefore, in case it is not desired to communicate directly through the built-in loudspeaker, then an earphone has to be connected to the mobile phone handset electrically with or without a wire, so that the user may converse with the receiving party through the earphone.

Due to the market demand, presently, the mobile phone has been developed into an intelligent handset having large size touch screen. As such, the intelligent handset is also designed to have a large size. But for a wire and wireless earphone, since they are separate components to the mobile phone, quite often it is rather difficult to place them on a handset.

Therefore, the design and placement of earphone to the mobile phone is not quite satisfactory, it has much room for improvements.

SUMMARY OF THE INVENTION

In view of the problems and drawbacks of the prior art, the present invention provides a handheld loudspeaker device, so as to overcome the shortcomings of the prior art.

A major objective of the present invention is to provide a handheld loudspeaker device, so that a mobile phone handset can be placed in the receiving space of its handheld base. When a user activates the loudspeaker function of the mobile phone, a stereo sound is output from a first loudspeaker slot and a second loudspeaker slot, and a second port in an open space state is used for the user to speak to a receiving party at a remote end through the Public Switched Telephone Network (PSTN) and the Internet. In applying the handheld loudspeaker device, electronic circuits for the wire or wireless earphone are not required, so that it would not incur power consumption.

Another objective of the present invention is to provide handheld loudspeaker device. Wherein, an outer shell is used to cover the first sound guidance tube, a second sound guidance tube, a first horn port, and a second horn port, to protect them from getting loose. The outer shell adopts a design of the conventional telephone handset, for the convenience of the user to hold, so that the mobile phone is not liable to drop to the ground. When the handheld loudspeaker device of the present invention is applied to an intelligent handset, it can be placed vertically or horizontally in the outer shell, for the user to view multi-media video or play games more conveniently. It can also provide comfort to the hand and ear of a user while conducting a phone conversation. The outer shell is further provided with an open slot having holes for connecting to the power cables of the mobile phone. That can be used to charge the mobile phone, so that the power supply of the mobile phone can be maintained without disruption.

A further objective of the present invention is to provide handheld loudspeaker device. Wherein, the handheld base, the first sound guidance tube, the second sound guidance tube, and the outer shell are made of thermal-plastic polyurethane. Therefore, the handheld loudspeaker device of the present invention is not only scratch proof, contamination proof, and washable. The thermal-plastic polyurethane is environment friendly containing no heavy metal, thus posing no harm to the health of human.

In order to achieve the above-mentioned objective, the present invention provides a handheld loudspeaker device, comprising at least: a handheld base, a first port and a second port, a first sound guidance tube, and a second sound guidance tube. Wherein, the front end of the handheld base is provided with a receiving space to place the mobile phone, two sides of the front end is provided each with a first loudspeaker slot and a second loudspeaker slot, and each of a first port and a second port is placed on one side of the receiving space. The first port is connected to the loudspeaker of the mobile phone to transmit sound, and the second port is connected to a microphone to receive voice. The first sound guidance tube is placed at rear end of the handheld base, and is provided with a first opening, a second opening, and a third opening; wherein, the first opening is connected to the first loudspeaker slot, the second opening is connected to the first port to receive sound. The second sound guidance tube is disposed at the rear end of the handheld base, and is provided with a fourth opening and a fifth opening. The fourth opening is connected to the second loudspeaker slot, and the firth opening is connected to the third opening, such that the first loudspeaker slot and the second loudspeaker slot are able to output stereo sound.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
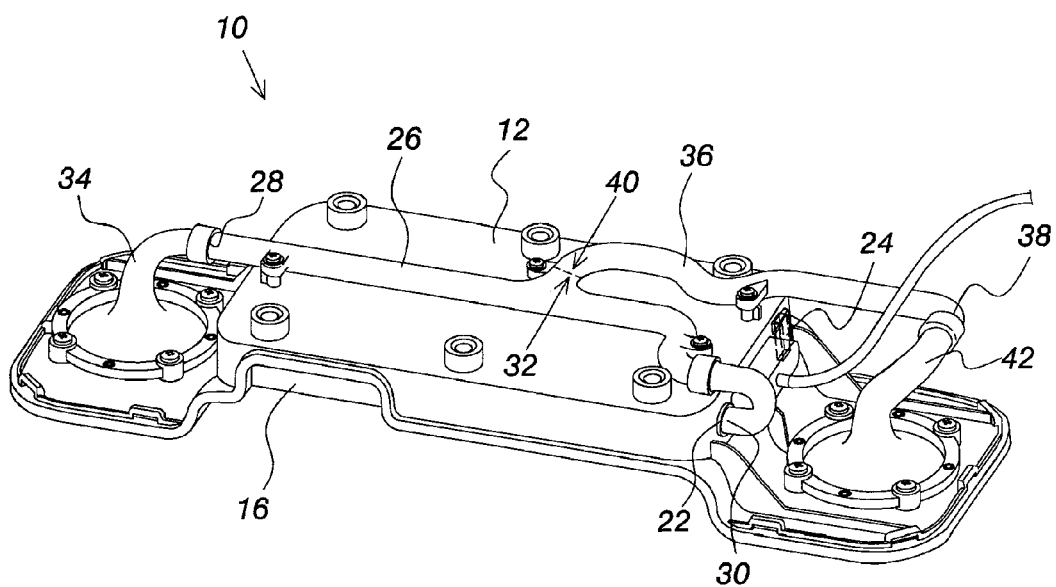
FIG. 1 is a schematic diagram of a handheld loudspeaker device according to the present invention.
Figure 2:
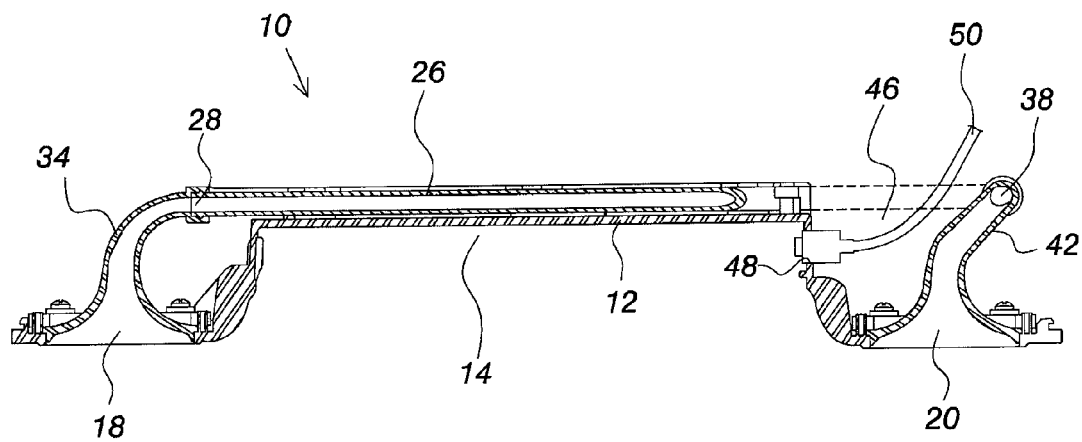
FIG. 2 is a cross section view of a handheld base according to the present invention.

The present invention provides a handheld loudspeaker device, for which the mobile phone handset is placed in the center of the handheld base, and it is connected to the mobile phone through a sound guidance tube. Refer to FIGS. 1 and 2 respectively for a schematic diagram of a handheld loudspeaker device according to the present invention; and a cross section view of a handheld base according to the present invention. As shown in FIGS. 1 and 2, a handheld loudspeaker device 10 of the present invention comprises at least: a handheld base 12, a first port 22 and a second port 24, a first sound guidance tube 26, and a second sound guidance tube 36.

Wherein, the front end of the handheld base 12 is provided with a receiving space 14 to place the mobile phone 16, which can be an intelligent handset, especially an iPhone type intelligent handset. Two sides of the front end of the handheld base 12 are provided each with a first loudspeaker slot 18 and a second loudspeaker slot 20. A first port 22 and a second port 24 are placed on one side of the receiving space 14. The first port 22 is connected to the loudspeaker of the mobile phone 16 to transmit sound, and the second port 24 is connected to a microphone of the mobile phone 16 to receive voice. The first sound guidance tube 26 is placed at rear end of the handheld base 12, and is provided with a first opening 28, a second opening 30, and a third opening 32. Wherein, one end of the first horn port 34 is connected to a first opening 28, and the opposite end is connected to the first loudspeaker slot 18. The second opening 30 is connected to the first port 22 to receive sound, and the second sound guidance tube 36 is disposed at the rear end of the handheld base 12, and is provided with a fourth opening 38, and a fifth opening 40. One end of the second horn port 42 is connected to the fourth opening 38, and the opposite end is connected to the second loudspeaker slot 20. The fifth opening 40 is connected to the third opening 32, such that the first loudspeaker slot 18 and the second loudspeaker slot 20 are able to output stereo sound.

Summing up the above, when a user is going to utilize the handheld loudspeaker device 10 of the present invention, all he has to do is to put the mobile phone 16 into the receiving space 14 of the handheld base 12, to make the loudspeaker and the microphone of the mobile phone 16 align respectively with the first port 22 and the second port 24, to activate the loudspeaker function of the mobile phone 16. At this time the loudspeaker of the mobile phone 16 is aligned with the first port 22 to transmit stereo sound. Also, at this time, the stereo sound is in the first loudspeaker slot 18, the second loudspeaker slot 20, the first sound guidance tube 26, and the second sound guidance tube 36, such that it is transmitted through vibrations of the air. Therefore, the user can hear the stereo sound at the first loudspeaker slot 18 and the second loudspeaker slot 20. When the microphone of the mobile phone 16 is aligned with the second port 24, since the second port 24 is in an open space state, therefore, the user may send out a voice though the second port 24, so that the microphone of the mobile phone 16 receives the voice, and it is connected to a remote end through Public Switched Telephone Network (PSTN) and Internet. In the present invention, the handheld loudspeaker device 10 can be used as an ordinary telephone handset, and therefore, there is no need to use any electronic circuit to amplify the sound and voice, thus it will not incur power consumption.

Figure 3:
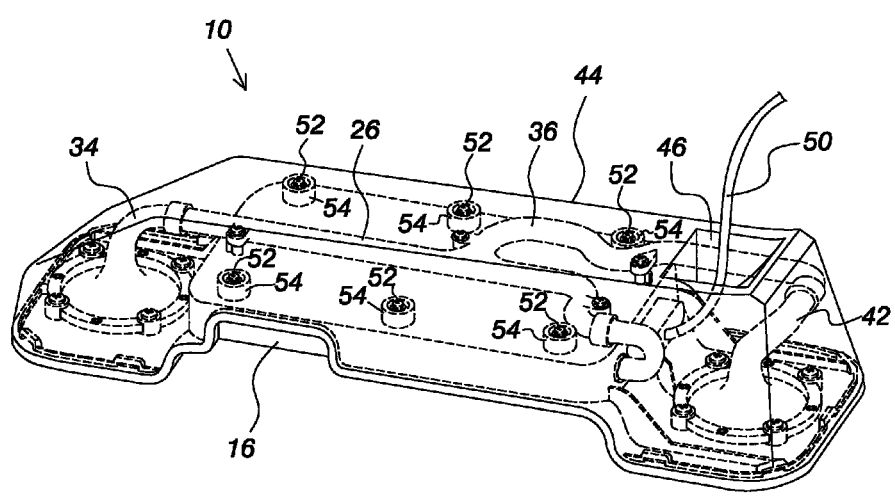
FIG. 3 is a schematic diagram of an outer shell according to the present invention.

Subsequently, refer to FIG. 3 for a schematic diagram of an outer shell according to the present invention. Also refer to FIG. 2 at the same time. As shown in FIGS. 2 and 3, in the present invention, an outer shell 44 is fastened to the rear end of the handheld base 12. The outer shell 44 is provided with open slots 46 having holes 48 for connecting to the power cable 50 of the mobile phone 16. Moreover, the outer shell 44 is provided with a plurality of fixing pieces 52, such as screws, and the rear end of the handheld base 12 is provided with a plurality of fixing hole bases 54, so that each fixing piece 52 is connected to the corresponding fixing hole base 54. Through covering the first sound guidance tube 26, the second sound guidance tube 36, the first horn port 34, and the second horn port 42 with an outer shell 44, thus protecting these components from getting lose.

The outer shell 44 adopts a design of the conventional telephone handset, for the convenience of the user to hold, so the mobile phone can be placed vertically or horizontally in the handheld base 12, such that a user can view the multimedia video or play games more conveniently. It can also provide comfort to the hand and ear while the user is conducting a phone conversation, and it is convenient for the user to hold, so that it is not liable to drop to the ground. When the user is not using the mobile phone 16, the outer shell 44 can be used as placing seat to receive and place the mobile phone 16. The outer shell 44 is provided with open slots 46 having holes 48 for connecting to the power cables 50 of the mobile phone 16. The outer shell 44 can be used as a charging seat to charge the mobile phone, so that the power supply of the mobile phone can be maintained without disruption.

Finally, as shown in FIGS. 1, 2, and 3, the handheld base 12, the first sound guidance tube 26, the second sound guidance tube 36, and the outer shell 44 are made of thermal-plastic polyurethane. Therefore, the handheld loudspeaker device 10 of the present invention is not only scratch proof, contamination proof, and washable. The thermal-plastic polyurethane is environment friendly and not containing heavy metal, thus posing no harm to the health of human.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A handheld loudspeaker device, comprising at least: a handheld base, its front end is provided with a receiving space to place a mobile phone, two sides of said front end are each provided with a first loudspeaker slot and a second loudspeaker slot; a first port and a second port, placed on one side of said receiving space, said first port is connected to a loudspeaker of said mobile phone to transmit sound, and said second port is connected to a microphone to receive voice; a first sound guidance tube, placed at rear end of said handheld base, and is provided with a first opening, a second opening, and a third opening, said first opening is connected to said first loudspeaker slot, said second opening is connected to said first port to receive sound; and a second sound guidance tube, disposed at rear end of said handheld base, and is provided with a fourth opening and a fifth opening, said fourth opening is connected to said second loudspeaker slot, and said fifth opening is connected to said third opening, such that said first loudspeaker slot and said second loudspeaker slot output sound.

2. The handheld loudspeaker device as claimed in claim 1, further comprising:
a first horn port and a second horn port, one end of said first horn port is connected to said first opening, its opposite end is connected to said first loudspeaker slot;
while one end of said second horn port is connected to said fourth opening, and its opposite end is connected to said second loudspeaker slot.

3. The handheld loudspeaker device as claimed in claim 2, further comprising:
an outer shell, to fasten onto rear end of said handheld base.

4. The handheld loudspeaker device as claimed in claim 3, wherein said outer shell is provided with a plurality of fixing pieces, and back end of said handheld base is provided with a plurality of fixing hole bases, so that each said fixing piece is connected to said corresponding fixing hole base.

5. The handheld loudspeaker device as claimed in claim 4, wherein said fixing piece is a screw.

6. The handheld loudspeaker device as claimed in claim 3, wherein said outer shell is used to cover said first sound guidance tube, said second sound guidance tube, said first horn port, and said second horn port.

7. The handheld loudspeaker device as claimed in claim 3, wherein said outer shell is provided with an open slot having a hole, for connecting to power cable of said mobile phone.

8. The handheld loudspeaker device as claimed in claim 1, wherein said mobile phone is an intelligent handset.

9. The handheld loudspeaker device as claimed in claim 3, wherein said handheld base, said first sound guidance tube, said second sound guidance tube, and said outer shell are made of plastic or metal.

10. The handheld loudspeaker device as claimed in claim 3, wherein said handheld base, said first sound guidance tube, said second sound guidance tube, and said outer shell are made of thermal-plastic polyurethane.

* * * * *